(12) United States Patent
Chu et al.

(10) Patent No.: US 7,769,905 B1
(45) Date of Patent: Aug. 3, 2010

(54) ADAPTING NETWORK COMMUNICATION TO ASYNCHRONOUS INTERFACES AND METHODS

(75) Inventors: Hsiao-Keng Jerry Chu, Palo Alto, CA (US); Sunay Tripathi, San Jose, CA (US); Cahya A. Masputra, Millbrae, CA (US)

(73) Assignee: Oracle America, Inc., Redwood City, CA (US)

( * ) Notice: Subject to any disclaimer, the term of this patent is extended or adjusted under 35 U.S.C. 154(b) by 1416 days.

(21) Appl. No.: 11/173,383

(22) Filed: Jun. 30, 2005

Related U.S. Application Data

(63) Continuation-in-part of application No. 10/917,995, filed on Aug. 13, 2004, now Pat. No. 7,502,870.

(51) Int. Cl.
*G06F 15/16* (2006.01)
(52) U.S. Cl. ................... 709/250; 709/215; 709/216; 709/217; 709/226; 708/250
(58) Field of Classification Search ................ 709/250
See application file for complete search history.

(56) References Cited

U.S. PATENT DOCUMENTS

2003/0204634 A1* 10/2003 Pinkerton et al. ........... 709/250
2004/0042483 A1* 3/2004 Elzur et al. ................. 370/463
2004/0047361 A1* 3/2004 Fan et al. .................... 370/411

* cited by examiner

*Primary Examiner*—William C Vaughn, Jr.
*Assistant Examiner*—Adam Cooney
(74) *Attorney, Agent, or Firm*—Marsh Fischmann & Breyfogle LLP; Kent A. Lembke; Jonathon A. Szumny

(57) ABSTRACT

A method for receiving network communication at a host is provided. The host has a network interface card (NIC) for receiving the network communication from a network. Data is requested through an application. A set of buffers (e.g., A, B, C, . . . ) is posted to system memory. Information regarding the set of buffers is passed to an adaptation layer. The adaptation layer is interposed between a socket layer and a transport layer of the protocol stack. The set of buffers identified in the adaptation layer is assigned expected sequence numbers (e.g., SN1, SN2, SN3 . . . ) for a sequence of incoming data (e.g., S1, S2, S3, . . . ). The adaptation layer reshuffles data of the sequence of incoming data to the set of buffers according to the expected sequence numbers. The expected sequence numbers are consecutively ordered to ensure that the sequence of incoming data in the ordered sequence is placed to the set of buffers according to the expected sequence numbers.

12 Claims, 12 Drawing Sheets

US 7,769,905 B1

ADAPTING NETWORK COMMUNICATION TO ASYNCHRONOUS INTERFACES AND METHODS

CROSS-REFERENCE TO RELATED APPLICATIONS

This application is a continuation-in-part of application Ser. No. 10/917,995, filed on Aug. 13, 2004 now U.S. Pat. No. 7,502,870, from which priority under 35 U.S.C. §120 is claimed. The disclosure of this application is incorporated herein by reference.

BACKGROUND

In conventional networking operations, random memory locations are allocated within a host device for use as temporary storage for incoming data received from a network. Traditionally, when a host device receives data through a network communication, first, the data is placed at random locations within the host memory. Subsequently, the data is copied from the random memory locations to the appropriate locations within the host memory. Furthermore, typically, the incoming data is generally handled at a low level within a networking architecture. Conversely, allocating the appropriate memory locations defined to be the final destination for the incoming data is handled at a high level within the networking architecture.

Accordingly, in typical networking operations, the incoming network data should be copied at least once from the random memory locations before the incoming network data can be placed in the appropriate locations in the host memory. Unfortunately, however, the latter copying operations can consume valuable host processor cycles, which could otherwise be used for more productive functions.

Additionally, in the conventional networking operations, synchronous socket interfaces are implemented. That is, the application can post only a single read buffer per reader thread at any given time. Furthermore, the reader thread is blocked until the corresponding network data arrives from the network. The implementing of synchronous socket interfaces, however, negatively affects network performance and further lowering throughput.

SUMMARY

It should be appreciated that the present invention can be implemented in numerous ways, such as a process, an apparatus, a system, a device, or a method on a computer readable medium. Several inventive embodiments of the present invention are described below.

In one embodiment, a method for receiving network communication at a host is provided. The host has a network interface card (NIC) for receiving the network communication from a network. Data is requested through an application that is in communication with an application layer of a protocol stack. A set of buffers (e.g., A, B, C, . . . ) is posted to system memory. Information regarding the set of buffers is passed to an adaptation layer. The adaptation layer is interposed between a socket layer and a transport layer of the protocol stack. The set of buffers identified in the adaptation layer is assigned expected sequence numbers (e.g., SN1, SN2, SN3 . . . ) for a sequence of incoming data (e.g., S1, S2, S3, . . . ). A set of pointers (e.g., PA, PB, PC, . . . ) referencing the set of buffers in the system memory is passed to a ring buffer in the NIC. The transport layer is allowed reassembly of the sequence of incoming data in an ordered sequence. The adaptation layer reshuffles data of the sequence of incoming data to the set of buffers according to the expected sequence numbers. The expected sequence numbers are consecutively ordered to ensure that the sequence of incoming data in the ordered sequence is placed to the set of buffers according to the expected sequence numbers.

In another embodiment, a method for managing receipt of network data at a host through a network interface card (NIC) connected to a network is provided. Data is received for an application. The data is communicated to an application layer of a protocol stack that is in communication through the NIC. A set of buffers (e.g., A, B, C, . . . ) is posted to the system memory. The posting of the set of buffers includes pre-posting the set of buffers to the NIC. Information regarding the set of buffers is passed to an adaptation layer that is interposed between a socket layer and a transport layer of the protocol stack. The set of buffers identified in the adaptation layer is assigned expected sequence numbers (e.g., SN1, SN2, SN3 . . . ) for a sequence of incoming data (e.g., S1, S2, S3, . . . ). A set of pointers (e.g., PA, PB, PC, . . . ) referencing the set of buffers in the system memory is passed to a ring buffer in the NIC. The transport layer is allowed reassembly of the sequence of incoming data in an ordered sequence. The reassembly is performed before the sequence of incoming data is presented to the adaptation layer. The adaptation layer is configured to reshuffle data of the sequence of incoming data to the set of buffers according to the expected sequence numbers. The expected sequence numbers are consecutively ordered to ensure that the sequence of incoming data in the ordered sequence is placed to the set of buffers according to the expected sequence numbers. The set of buffers is communicated with the reshuffled data to the socket layer in accordance with the expected sequence numbers.

In yet another embodiment, a network protocol stack is provided. The network stack includes an application layer, a socket layer, and an adaptation layer. The application layer is configured to mange requests for data from an application. The socket layer is configured to establish a connection for the receipt of data. The adaptation layer is configured to enable reshuffling of data into correct buffers when necessary. The adaptation layer is charged with labeling each buffer that is pre-posted to a network interface card (NIC) with an expected sequence number. The adaptation layer uses the expected sequence number of each buffer to facilitate the reshuffling of the data received from a lower transport layer.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings.

DETAILED DESCRIPTION

Figure 1:
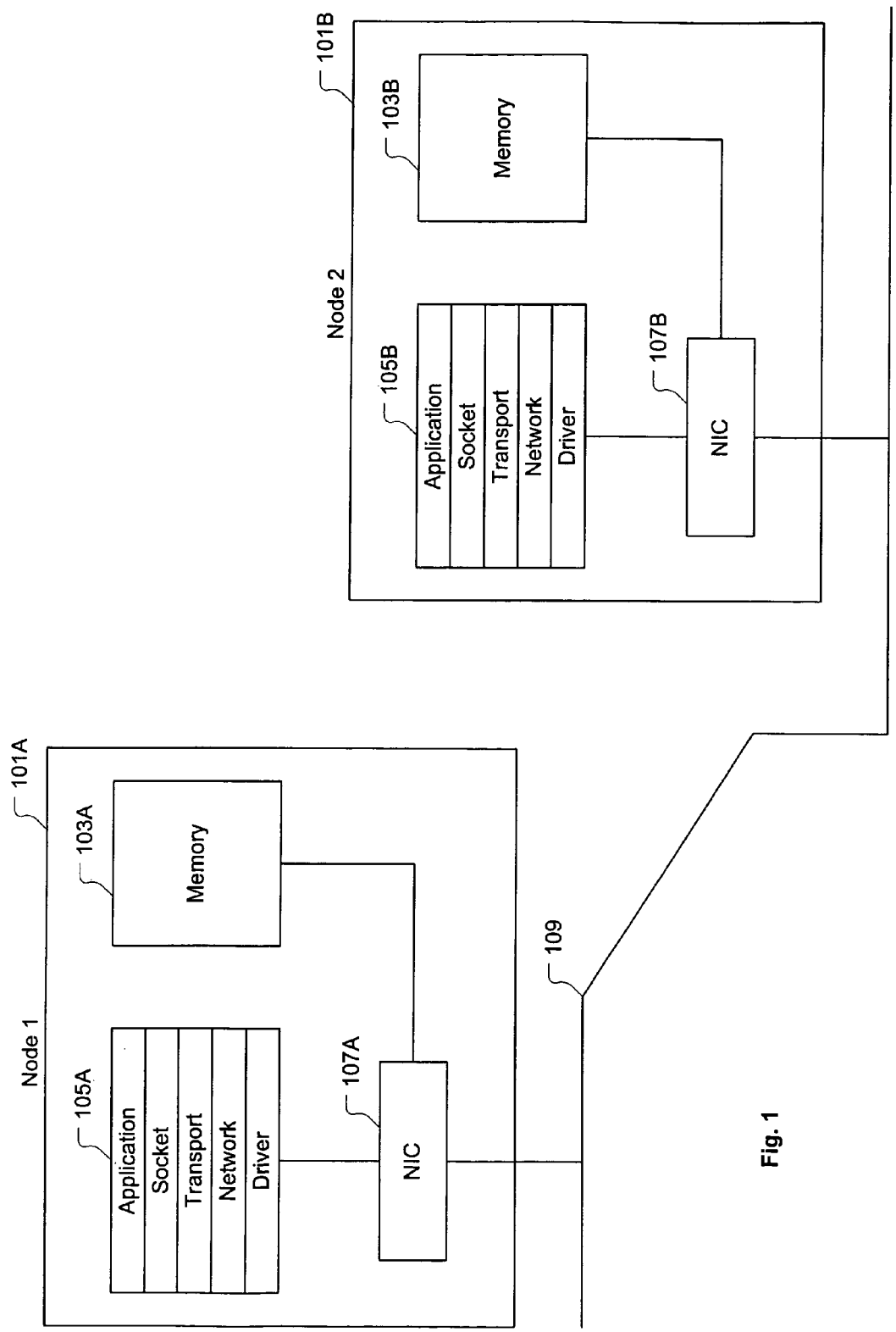
FIG. 1 is an illustration showing an exemplary communication network, in accordance with one embodiment of the present invention.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

It should be appreciated that the present invention can be implemented in numerous ways, including as a process, an apparatus, a system, a device, or a method. Several exemplary embodiments of the invention will now be described in detail with reference to the accompanying drawings. Furthermore, one of ordinary skill in the art must recognize and appreciate that although specific reference may have been made to terminology defined by Sun Microsystems, Inc., it should be understood that any name could be used for such terms, so long as the desired functionality is achieved.

In one example, a zero-copy design is implemented so as to circumvent the receive side copying of the incoming network data sequences. As used herein, the zero-copy design scheme of the present invention provides a buffer management scheme wherein the incoming network data sequences are moved on a path between the application and the NIC almost without being copied by the host processor. According to one embodiment, the present invention provides a zero-copy approach that involves operating the NIC such that incoming data sequences are directly allocated to specific memory locations.

In a situation wherein the transport layer in the receiving node is to ensure the ordering of the incoming data sequences, the data sequences propagated up to the transport layer may need to be reshuffled so that the data sequences are placed in the correct pre-posted buffers identified by the application. In one embodiment, the present invention implements a zero-copy stack architecture herein referred to as a network protocol stack, wherein an adaptation layer is defined between the socket layer and the transport layer.

The adaptation layer operates on top of the transport layer so as to place the incoming data sequences into the correct buffers, if necessary. In accordance with one example, the zero-copy stack architecture of the present invention implements the adaptation layer defined between the socket layer and the transport layer so as to maintain the posting order of the application buffers. According to one embodiment, the adaptation layer is further configured to label each buffer with the expected sequence number of the respective incoming data sequence. Thus, by placement between the socket layer and the transport layer, the adaptation layer operates to isolate substantially all the buffer management tasks. According to one example, the adaptation layer adapts the traditional network I/O model to the client-transport interfaces based on passing buffers and the asynchronous socket semantics, so that the impact to the existing transport architecture is minimal.

For ease of understanding, Section I provides a description of network communications. Specifically, a description of copying of the incoming network data by a receiving node in a network. Further described are the receive zero-copy pre-posting application buffer scheme of the present invention (i.e., directly placing the incoming network data sequences into respective host memory locations). Section II provides a description for adapting networking input/output to asynchronous socket interfaces. In particular, the matching of incoming network data sequences with application buffers in socket interfaces as well as the zero-copy pre-posting application buffer scheme of the present invention using asynchronous socket interfaces.

I. Network Communication

Multiple Copying of Incoming Network Data Sequences by Receiving Node:

FIG. 1 is an illustration showing an exemplary communication network, in accordance with one embodiment of the present invention. The network includes a first node 101A and a second node 101B connected through a network medium 109. The first node 101A includes a protocol stack 105A, a memory 103A, and a network interface card (NIC) 107A. Similarly, the second node 101B includes a protocol stack 105B, a memory 103B, and a NIC 107B. Each NIC 107A and 107B serves to connect its respective node, 101A and 101B, to the network medium 109. In various embodiments, the network medium 109 can be defined in accordance with a wireless network, a physical network, or a combination thereof, as known to those skilled in the art. Each NIC 107A and 107B is also connected to communicate directly with its respective node's memory, 103A and 103B. Furthermore, each NIC 107A and 107B is connected to communicate with a lowest level of its respective node's protocol stack, 105A and 105B. It should be appreciated that each node 101A/101B in the exemplary communication network of FIG. 1 can include a number of other components not explicitly shown. For example, each node includes a processor. Additionally, each node can include other common computer components and peripheral devices, such as storage components, display components, user interface components, etc.

Each protocol stack 105A and 105B is defined by a number of protocol layers. Each protocol layer represents a set of predefined rules for governing various networking operations. Protocols present at each layer define a distinct level of capability and service. In addition, protocols present at each layer build upon protocols at lower levels and provide support for protocols at upper levels. In the exemplary embodiment of FIG. 1, each protocol stack 105A and 105B includes, from bottom to top, a driver layer, a network layer, a transport layer, a socket layer, and an application layer. It should be appreciated that the protocol stack of FIG. 1A represents one of many possible network protocol stack configurations. In addition, it should be understood that the principles of the present invention as described herein could be equally applied regardless of the specific network protocol stack configuration. However, for purposes of discussion, the present invention, as provided in Part I, will be described with respect to the exemplary network protocol stack of FIG. 1.

The application layer of the protocol stack 105A/105B provides services for applications executing on the respective node. The application layer protocols are the primary interface between the applications executing on the node and the network. Generally speaking, the application layer protocols provide access or handling services for a process accessing the network. The access or handling services can be directory-based, file-based, or message-based. Examples of application layer protocols include: CMIP (common management information protocol), SNMP (simple network management protocol), FTAM (file transfer, access, and management), FTP (file transfer protocol), NFS (network file system), RFS (remote file system), X.400, SMTP (simple mail transfer protocol), and Telnet. One of ordinary skilled in the art will recognize and appreciate the details of each of the above-mentioned application layer protocol examples. It should be understood that the principles of the present invention as described herein can be equally applied regardless of the specific application layer protocol.

The socket layer of the protocol stack 105A/105B provides functionality for maintaining, synchronizing, and sequencing the dialog in a network connection. For example, the socket layer protocols generally allow two nodes to establish a reliable connection for data transfer. Also, the socket layer protocols can include capabilities for monitoring sessions to ensure they are running smoothly. The socket layer protocols operate to define a network connection by establishing a path between two sockets. In network communication, a socket includes a port and a network address of the node on which the port is located. Each socket represents a logical entity through which an application communicates with a network. Examples of socket types include: a datagram socket, a stream socket, a raw socket, and a dynamically assigned socket (DAS). Those skilled in the art will recognize and appreciate the details of each of the above-mentioned socket type examples. It should be understood that the principles of the present invention as described herein can be equally applied regardless of the specific socket layer protocol.

The transport layer represents a dividing layer within the protocol stack 105A/105B. The transport layer is positioned between upper layers of the protocol stack that are strongly application-dependent and lower layers of the protocol stack that are strongly network-dependent. When operating at a sending node where data packets are being passed down the layers of the protocol stack, the transport layer ensures that data packets are sent off in the proper sequence and format. When operating at a receiving node where data packets are being passed up the layers of the protocol stack, the transport layer ensures that data packets are received in the proper sequence and format. Examples of transport layer protocols include: TCP (transmission control protocol), UDP (user datagram protocol), SPX (sequenced packet exchange), PEP (packet exchange protocol), VOTS (VAX OSI transport service), AEP (AppleTalk echo protocol), ATP (AppleTalk transaction protocol), NBP (name building protocol), and RTMP (routing table maintenance protocol). Those skilled in the art will recognize and appreciate the details of each of the above-mentioned transport layer protocol examples. It should be understood that the principles of the present invention as described herein can be equally applied regardless of the specific transport layer protocol.

The network layer of the protocol stack 105A/105B is responsible for controlling the flow of data from sender to receiver on the network. The network layer represents the layer at which routing decisions are made and carried out. Generally, the network layer protocols are not defined to guarantee delivery of the data successfully. One example of a network layer protocol is the Internet protocol (IP). The IP provides directionless, best-effort delivery of data packets between nodes. The term directionless means that data packets do not necessarily follow the same path when traveling between their source node and their destination node. The term best-effort means that there is no guarantee that data packets will be delivered in the correct order, or at all. Those skilled in the art will recognize and appreciate the details of the IP. Also, those skilled in the art will recognize the existence of other network layer protocols not explicitly mentioned herein. It should be understood that the principles of the present invention as described herein can be equally applied regardless of the specific network layer protocol.

At the bottom layer of the protocol stack 105A/105B, the driver layer is defined to provide network access to applications executing on the node. The driver layer protocol is the interface between the application programs and the physical network. In general, the driver layer protocols provide the NIC with the bytes to be transmitted onto the network. Furthermore, the driver layer ensures compatibility between the NIC and the upper layer protocols. Examples of NIC drivers that can be embodied in the driver layer include: NDIS (network driver interface specification) and ODI (open data-link interface). One of ordinary skill in the art will recognize and appreciate the details of each of the above-mentioned driver layer protocol examples. Furthermore, one of ordinary skill in the art should understood that the principles of the present invention as described herein can be equally applied with essentially any driver layer protocol that is compatible with the NIC 107A/107B and the overlying network layer protocol.

Figure 8:
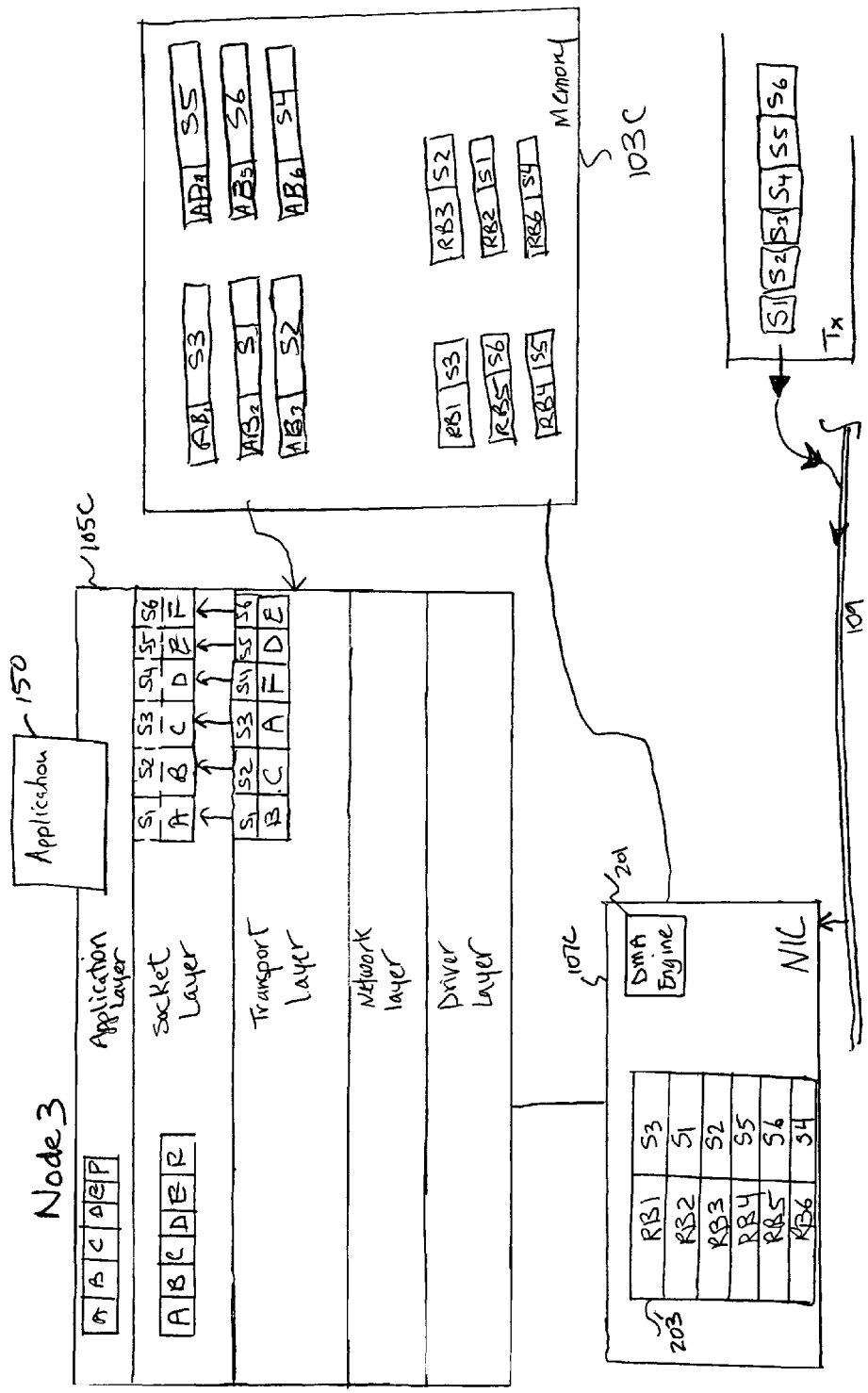
FIG. 8 is a detailed view of a third node acting as a receiving node on the network, in accordance with one embodiment of the present invention.

In one embodiment, the present invention is focused on events that occur at a node of the network involved in receiving data packets. Therefore, the remainder of the discussion will be directed to activities that are performed at a receiving node of the network. For discussion purposes, consider that the first node 101A of FIG. 1 and third node 101C of FIG. 8 are acting as receiving nodes on the network.

Figure 2:
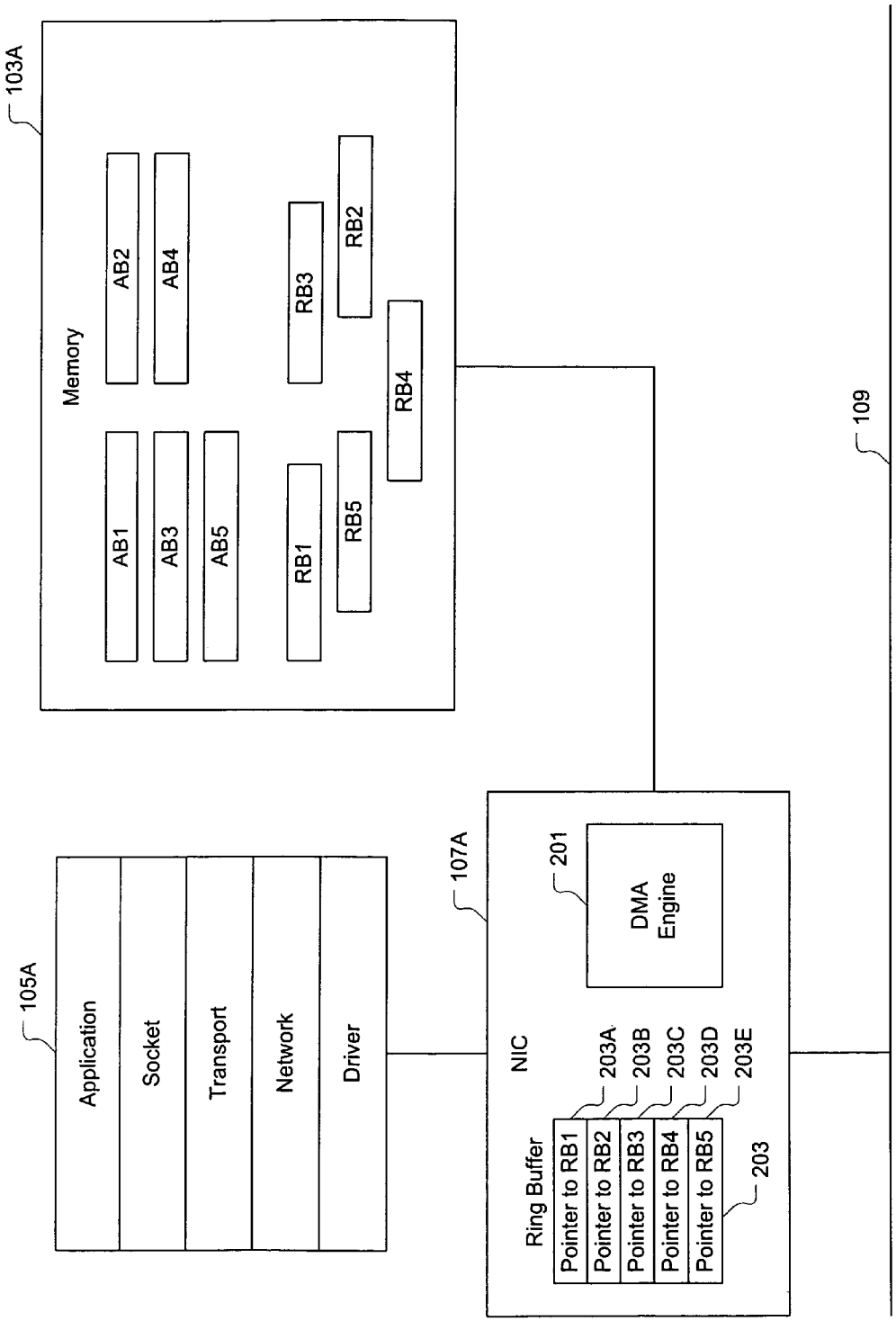
FIG. 2 is an illustration showing a more detailed view of the first node acting as a receiving node on the network, in accordance with one embodiment of the present invention.

FIG. 2 is an illustration showing a more detailed view of the first node 101A acting as a receiving node on the network, in accordance with one embodiment of the present invention. As previously discussed, the first node 101A includes the NIC 107A connected to each of the network medium 109, the protocol stack 105A, and the memory 103A. The NIC 107A includes a ring buffer 203 and a direct memory access (DMA) engine 201. The ring buffer 203 is represented by a number of registers 203A-203E defined to operate in a first-in-first-out (FIFO) manner. Therefore, at a given instance in time, one register of the ring buffer 203 will be identified as the head register and one register will be identified as the tail register. The head register is accessed when data is to be withdrawn from the ring buffer 203. The incoming network data sequences (herein interchangeably referred to as incoming data packets, incoming data sequences, data packets, or data) to be placed in the ring buffer 203 are successively placed in the registers following the tail register. As data is withdrawn from and placed in the ring buffer, the specific registers representing the head register, and the tail register, adjust such that the ring buffer 203 operates in the FIFO manner.

The ring buffer 203 is used to store pointers to locations in the memory 103A of the host device to which the NIC 107A is attached. As data packets are received by the NIC 107A from the network medium 109, the DMA engine 201 operates to place the incoming data packets in the memory locations stored in the ring buffer 203. Conventionally, the ring buffer 203 is loaded with pointers to random memory locations in the host memory 103A. For example, FIG. 2 shows ring buffer registers 203A-203E storing pointers to random buffer locations RB1-RB5, respectively. The random buffer locations corresponding to RB1-RB5 are depicted in the memory 103A. As each data packet arrives at the NIC 107A, the DMA engine 201 operates to place the data packet at the memory location corresponding to the pointer stored in the head register of the ring buffer 203. Also, once the head register value is used, i.e., consumed, for placement of an incoming data packet, a register following the consumed head register in the ring buffer 203 is specified as the new head register in accordance with the FIFO manner of operation. Thus, the first five data packets received by the NIC 107A will be placed in random buffer locations RB1, RB2, RB3, RB4, and RB5, respectively.

After each pointer in the ring buffer 203 is consumed by the NIC 107A to place an incoming data packet, the register containing the consumed pointer needs to be updated to contain a new pointer. The new pointer needs to be stored in the register before the NIC 107A traverses the ring buffer 203 and needs to access the register again. Thus, as data packets arrive and are placed in the host memory 103A by the NIC 107A, the consumed registers of the ring buffer 203 are updated with a fresh pointer to a new random memory location. The driver layer protocol has responsibility for writing the random memory location pointers to the ring buffer 203.

Once the data packets are placed in the random memory locations by the NIC 107A, according to one embodiment, the transport layer protocols operate to copy the data packets from respective random memory locations, RB1-RB5, to appropriate memory locations allocated by the application layer, AB1-AB5. Additional embodiments and information regarding the assembling of the data packets by the transport layer in accordance with the transmission order are provided with respect to FIGS. 8-12.

Unfortunately, the copying of the data packets from the random memory locations to the appropriate memory locations involves a substantial number of host device processor cycles. In order to avoid expenditure of the host device processor cycles, it is desirable to avoid having to copy the data packets from the random memory locations to the appropriate memory locations as allocated by the application layer, as discussed in more detail below.

Figure 3:
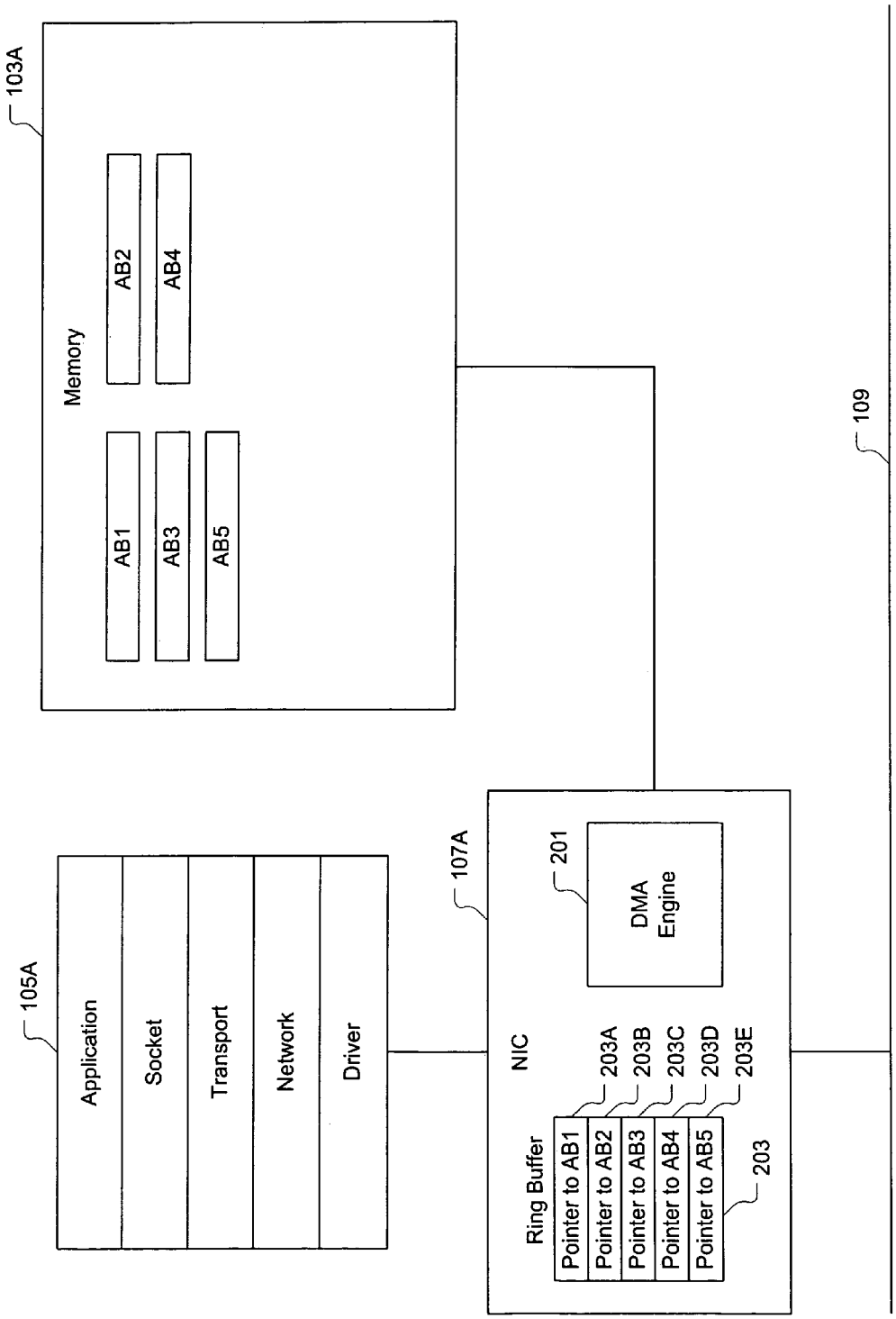
FIG. 3 is an illustration showing the first node operating to avoid having to perform a received side copy of incoming data, in accordance with one embodiment of the present invention.

Pre-Posting Application Buffers to NIC:

Proceeding to FIG. 3, an illustration of the first node 101A operating to avoid having to perform a received side copy of the incoming network data sequences is provided, in accordance with one embodiment of the present invention. More specifically, data packets that are received from the network medium 109 by the NIC 107A are placed directly into the appropriate memory locations as allocated by the application layer protocol. To accomplish this direct placement of incoming data packets, pointers to the appropriate memory locations AB1-AB5 are passed downward from the application layer of the protocol stack 105A to the ring buffer 203 of the NIC 107A. As used herein, the process of passing down the application allocated buffer locations to the NIC 107A is referred to as pre-posting of application buffers to the NIC 107A.

Once the application buffers are pre-posted to the ring buffer 203 of the NIC 107A, the DMA engine 201 operates to place incoming data packets in the host memory 103A locations corresponding to the pointers stored in the registers 203A-203E of the ring buffer 203. Also, as previously described with respect to FIG. 1, the ring buffer 203 is operated in a FIFO manner. Thus, in accordance with the foregoing, pre-posting of application buffers to the NIC 107A enables placement of incoming data packets into appropriate host memory locations, as allocated by the application, without having to perform memory copy operations. Also, when buffers are pre-posted to the NIC 107A, ownership of the respective buffers is also passed to the NIC 107A. Thus, when the application pre-posts a buffer to the NIC 107A, the application yields ownership of the buffer to the NIC 107A. The application is required to regain ownership of the buffer from the NIC 107A in order to manage the data placed in the buffer by the NIC 107A.

Pre-posting application buffers to the NIC 107A provides an attractive solution for avoiding or minimizing receive side copy of incoming data. However, the pre-posting of application buffers also presents certain challenges addressed by the zero-copy pre-posting scheme of the present invention.

One such challenge is associated with size differences between application allocated buffers and conventional NIC buffer sizes. NICs usually allocate and manage buffers of a network maximum transfer unit (MTU) size. For example, a common MTU for Ethernet is 1500 bytes. Applications, however, allocate and manage buffers of a system page size. One popular system page size is 8192 bytes. Therefore, a discrepancy often exists between the buffer size that the NIC is configured to manage and the buffer size allocated by the application. As will be discussed below, this discrepancy can potentially cause buffer management difficulty.

For NICs, the management of MTU size buffers is easy and natural. Each arriving data packet will occupy one buffer. When an end of Ethernet frame is detected, the buffer will be considered complete. Once the buffer is complete, the NIC will automatically return ownership of the buffer to the application to be managed as deemed necessary by the application. When buffers of system page size are pre-posted to the NIC by the application, however, the NIC is required to manage buffers of unfamiliar size. Consequently, the NIC needs to rely on something other than an end-of-link layer frame to determine when a buffer is completed. It is important for the NIC to be able to determine on its own when a buffer is completed in order to know when to return ownership of the buffer to the application from which the buffer was pre-posted. Otherwise, the application must perform a buffer reclamation process to reacquire ownership of the buffer. The buffer reclamation process can be expensive in terms of host processor cycles consumed. An increased processor load associated with performing buffer reclamation processes can diminish processor load savings associated with pre-posting the application buffers to avoid the receive side copy operations.

As the NIC operates to place incoming data packets into the pre-posted application buffers, the NIC will automatically return ownership of each buffer to the application when the buffer is filled, i.e., completed. However, buffer ownership becomes an issue when a buffer is left partially filled by incoming data. A partially filled buffer can be caused by a variety of conditions. For example, at the end of the network communication, the final data packet may only fill a portion of a buffer. The present invention provides a method by which partially filled buffer ownership can be resolved.

In accordance with one embodiment of the present invention, the NIC is configured to operate in accordance with both a message-based transport protocol, e.g., UDP, and a byte-stream oriented transport protocol, e.g., TCP. When operating in accordance with the message-based transport protocol, the NIC is configured to recognize a message boundary such as an end-of-data marker. Upon recognition of the message boundary, the NIC is further configured to complete the current buffer by automatically returning ownership of the buffer to the application. Thus, when receiving a message-based network communication, the NIC is configured to automatically return ownership of each buffer to the application either upon completion of the buffer or upon recognition of a message boundary. Therefore, when operating the NIC of the present invention to receive a message-based network communication, the application is not required to actively reclaim ownership of buffers from the NIC. Consequently, host processor cycles are saved by avoiding the receive side memory copy of incoming data and avoiding the need for buffer reclamation.

When operating in accordance with the byte-stream transport protocol, the NIC is configured to place each incoming data packet in a separate application buffer. Also, the application layer protocol and the NIC are each defined to manage buffer ownership on a byte-level, rather than a buffer level. As incoming data is placed in memory by the NIC, the application layer protocol operates to assume ownership of data that has been placed in the memory by the NIC. The assumption of ownership by the application layer protocol is performed on a byte-level basis. Thus, as the NIC fills a buffer in the host memory, the application is capable of assuming ownership of each byte of data that is placed in the buffer. The assumption of byte-level ownership by the application layer protocol can be performed in accordance with essentially any schedule required by the application. However, the application is not permitted to assume ownership of a portion of a buffer that has been pre-posted to the NIC, but has not yet been filled with data by the NIC.

To support the byte-level assumption of buffer ownership by the application, the NIC is configured to only fill buffers in a forward direction. The NIC operates as if it retains ownership of the entire pre-posted buffer until the buffer is completely filled, at which point the NIC automatically returns ownership of the entire buffer to the application. However, since the NIC is not capable of filling buffers in a reverse direction, byte-level buffer ownership conflicts between the application and NIC are avoided. For example buffer ownership conflict is avoided when the application assumes ownership of a buffer portion that has already been filled by the NIC, wherein the NIC continues to fill the same buffer with data in the forward direction.

Provision for byte-level buffer ownership by the present invention renders moot the issue associated with buffer size discrepancies between the application and the NIC. More specifically, as data packets are received by the NIC, the NIC operates to place each received data packet in the appropriate pre-posted application buffer. Since the application automatically assumes byte-level ownership of buffers that have been filled by the NIC, it is not necessary for the NIC to monitor the end of data for returning buffer ownership to the application.

Yet another challenge associated with the pre-posting application buffers to the NIC is to ensure that the data packets are placed in the correct buffer locations in host memory. Since data packets can be received out of sequence by the NIC, it is necessary to ensure that data packets are ordered correctly when placed in the host memory. The present invention provides a method by which incoming data packets can be managed to ensure proper ordering when placed in the host memory by the NIC.

For an ordered data transport, the NIC hardware/software is configured to ensure that buffers are not posted for data packets that previously arrived at the NIC. The NIC of the present invention enforces this rule by monitoring the highest data sequence number that has arrived at the NIC from the network. The NIC further operates to reject attempts to pre-post application buffers that correspond to a data sequence number that is less than or equal to the highest data sequence number that has previously arrived at the NIC. Additionally, if a data packet arrives at the NIC having a sequence number less than or equal to the highest data sequence number that has previously arrived at the NIC, the arriving data packet is processed through a backup path. The backup path generally corresponds to the previously described approach in which the data packet is placed in a random location in the host memory and then copied to the correct location in host memory. The protocol stack is defined to detect when a data packet has been processed through the backup path. The protocol stack includes logic to copy the data packet transmitted through the backup path from the random location in memory to the correct application buffer.

The backup path is also used when an under-run condition occurs. The under-run condition occurs when a buffer of an incoming data packet has not been pre-posted to the NIC prior to arrival of the incoming data packet. It should be further appreciated that the method of present invention, for rejecting an attempt to pre-post an application buffer that corresponds to a data sequence number that is less than or equal to the highest data sequence number that has previously arrived at the NIC, will also resolve an attempt to post an under-run initiating application buffer to the NIC. Also, with the present invention, the application retains ownership of application buffers whose data packet is processed through the backup path, thus avoiding a need for the application to reclaim these buffers from the NIC. Various aspects of the present invention are further described below with respect to FIGS. 4 through 7.

Figure 4:
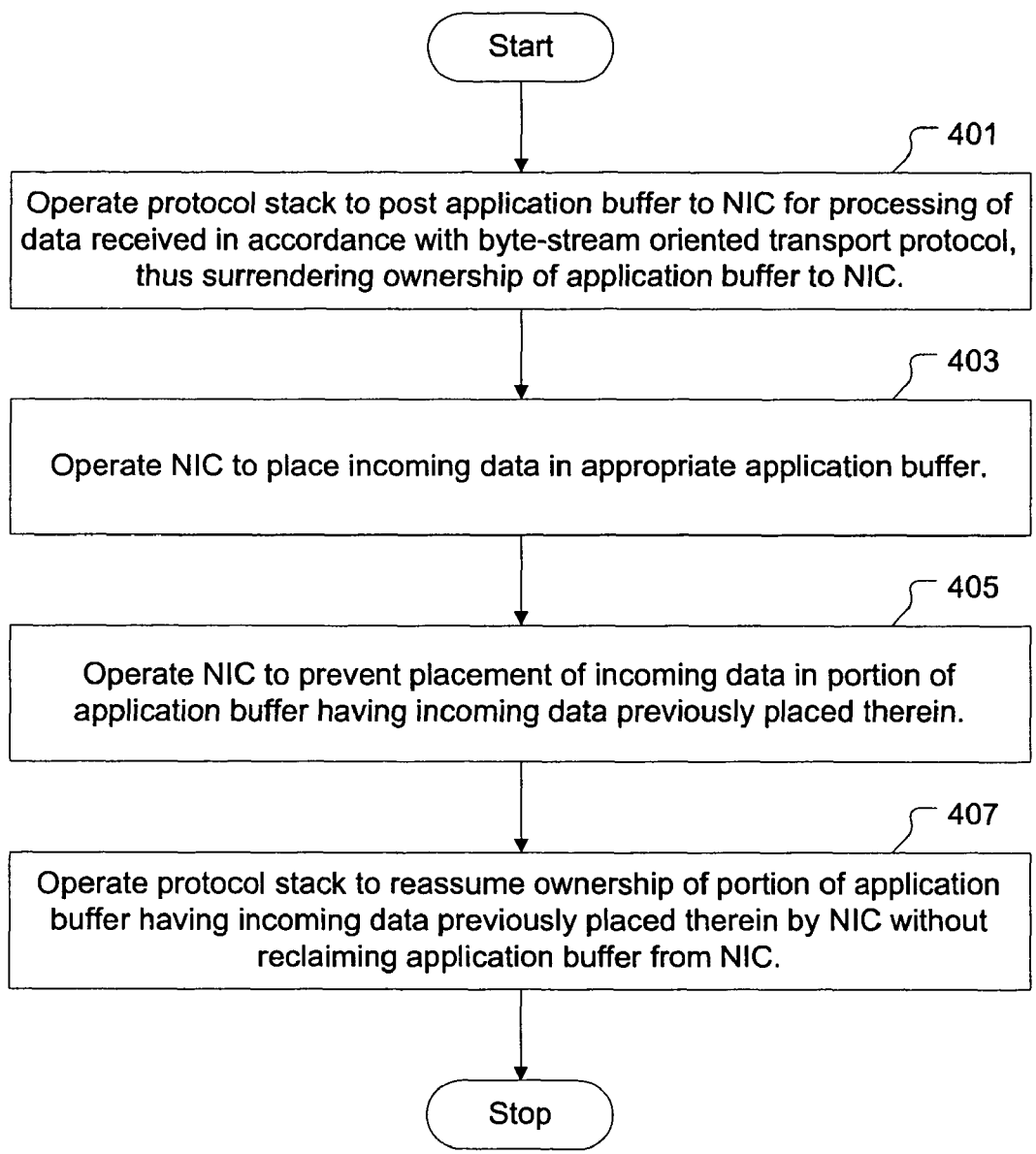
FIG. 4 is an illustration showing a flowchart of a method for receiving network communication, in accordance with one embodiment of the present invention.

FIG. 4 is an illustration showing a flowchart of a method for receiving network communication, in accordance with one embodiment of the present invention. The method includes an operation 401 in which a protocol stack of a host device operates to post an application buffer to a NIC, wherein the application buffer represents a pointer to a host memory location. In one embodiment, the application buffer is allocated by an application executing on the host device. The application buffer is to be used for processing a data packet to be received by the NIC in accordance with a byte-stream oriented transport protocol. Posting of the application buffer serves to surrender ownership of the corresponding host memory location from the host device to the NIC. Posting of the application buffer to the NIC is performed by passing the corresponding host memory location pointer downward through the protocol stack of the host device from an application layer to the NIC, wherein the NIC is located below the protocol stack.

In an operation 403, the NIC is operated to place the incoming data packet in the posted application buffer. More specifically, the NIC performs a direct memory access operation to place the data received at the NIC in the host memory location corresponding to the posted application buffer. In an operation 405, the NIC is operated to prevent placement of data in a portion of the application buffer having incoming data previously placed therein by the NIC. Thus, the NIC is operated to restrict data writing to a forward direction. Also, in an operation 407, the protocol stack of the host device is operated to re-assume ownership of the portion of the application buffer within the host memory having data placed therein by the NIC. In the operation 407, ownership of the application buffer portion is re-assumed by the host device without actively reclaiming the application buffer portion from the NIC. The operation 407 is enabled by operating the host device to manage memory ownership on a byte-level.

Figure 5:
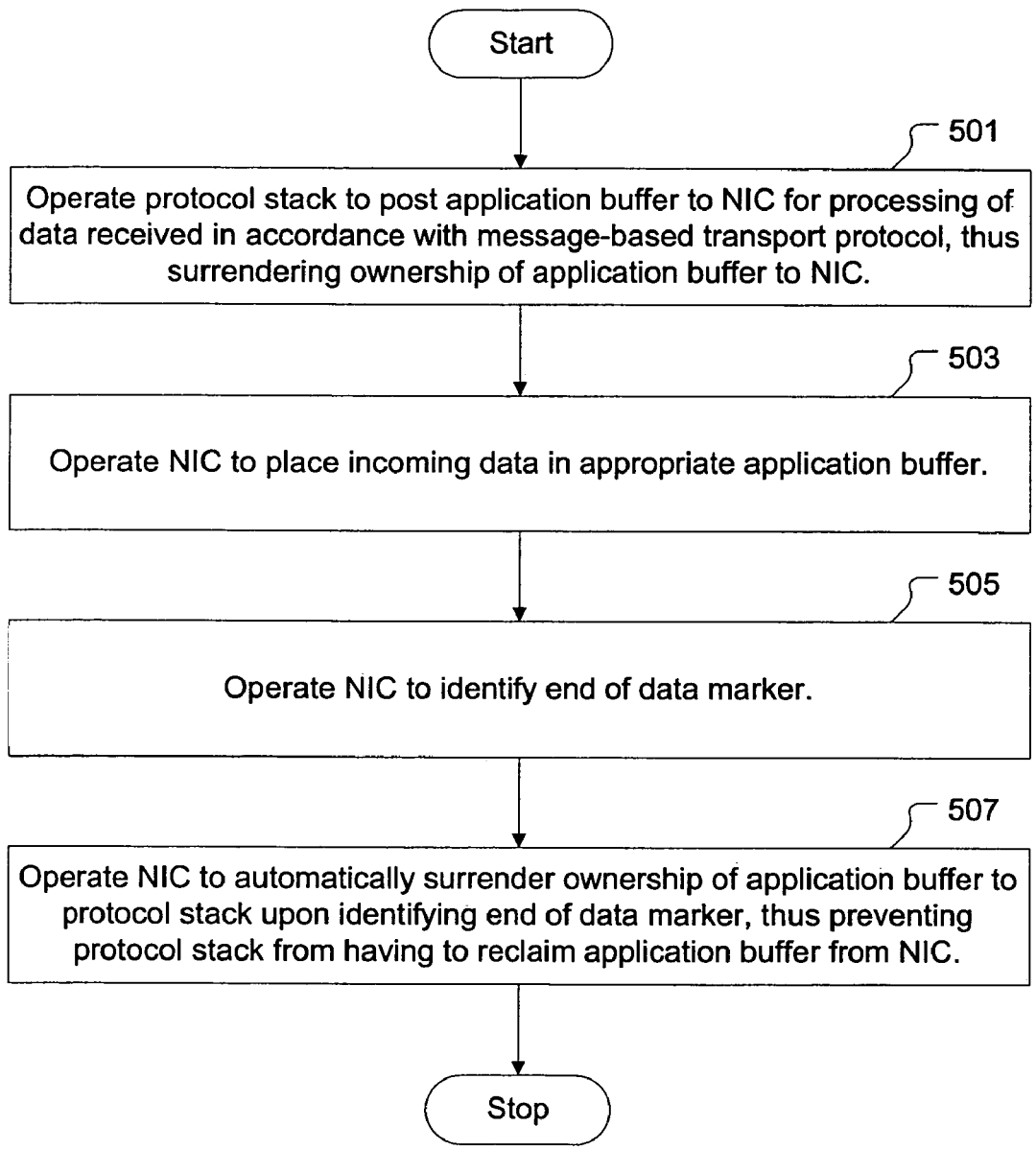
FIG. 5 is an illustration showing a flowchart of a method for receiving network communication in accordance with a message-based transport protocol, in accordance with one embodiment of the present invention.

FIG. 5 is an illustration showing a flowchart of a method for receiving network communication in accordance with a message-based transport protocol, in accordance with one embodiment of the present invention. In one embodiment, the message-based transport protocol is a user datagram protocol (UDP). The method includes an operation 501 in which a protocol stack of a host device operates to post an application buffer to a NIC, wherein the application buffer represents a pointer to a host memory location. In one embodiment, the application buffer is allocated by an application executing on the host device. The application buffer is to be used for processing a data packet to be received by the NIC in accordance with a message-based transport protocol. Posting of the application buffer serves to surrender ownership of the corresponding host memory location from the host device to the NIC. Also, posting of the application buffer to the NIC is performed by passing the corresponding host memory location pointer downward through the protocol stack of the host device from an application layer to the NIC, wherein the NIC is located below the protocol stack.

The method also includes an operation 503 in which the NIC is operated to place the incoming data in the host memory location corresponding to the pointer posted in the operation 501. In an operation 505, the NIC is operated to identify an end of data marker associated with the incoming data received at the NIC. Additionally, in an operation 507, the NIC is operated to automatically surrender ownership of the host memory location corresponding to the pointer posted in the operation 501, to the host device upon identification of the end of data marker in the operation 505. Thus, the host device avoids actively reclaiming ownership of the host memory location from the NIC.

Figure 6:
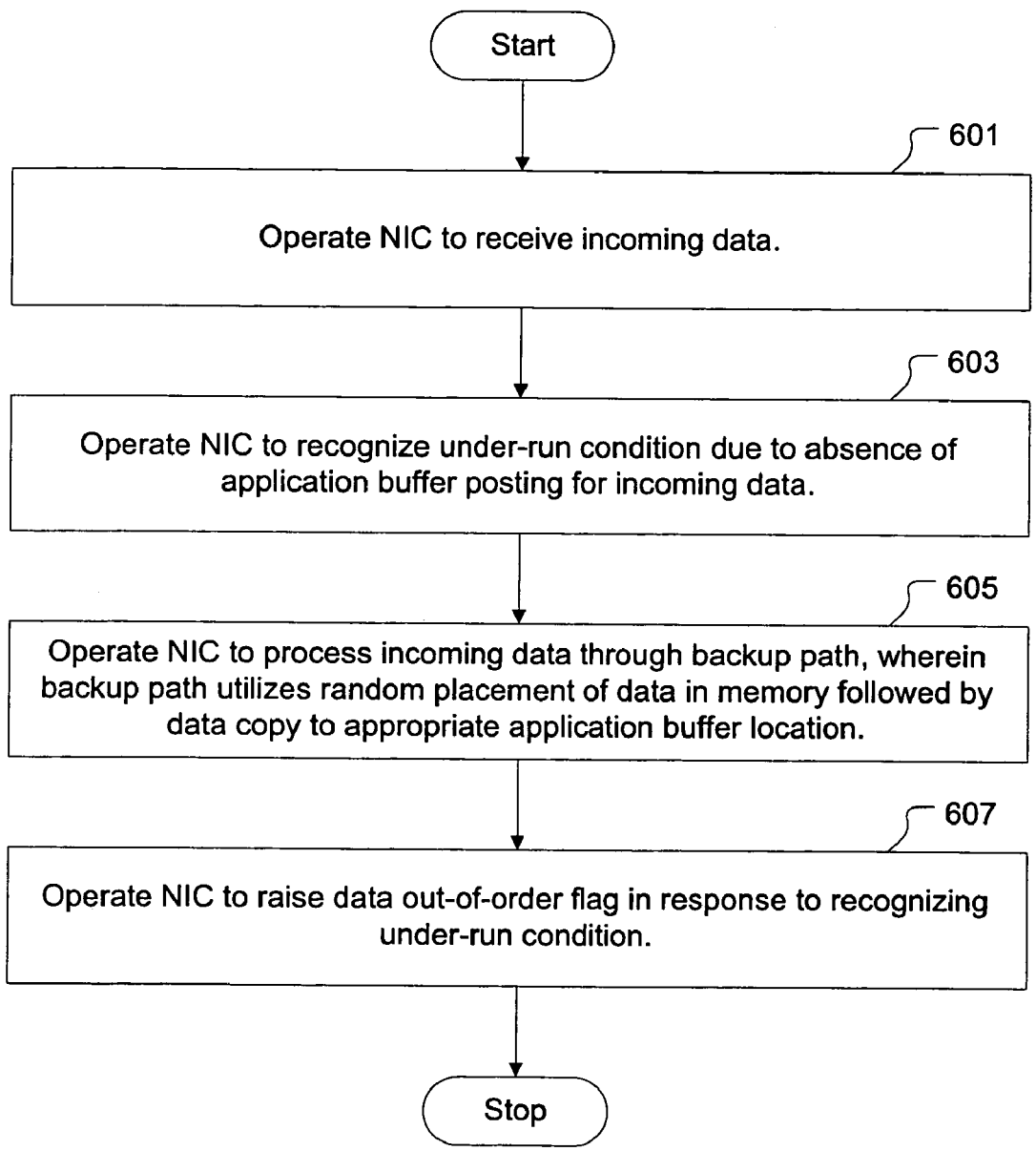
FIG. 6 is an illustration showing a flowchart of a method for handling an under-run condition at a receive side of a network communication, in accordance with one embodiment of the present invention.

FIG. 6 is an illustration showing a flowchart of a method for handling an under-run condition at a receive side of a network communication, in accordance with one embodiment of the present invention. The method includes an operation 601 for operating a NIC to receive incoming data from a network. In an operation 603, the NIC is operated to recognize an under-run condition due to an absence of an application buffer posting to be used for the incoming data. In an operation 605, the NIC is operated to process the incoming data through a backup path. The backup path includes placing the incoming data at a random memory location in the host memory, followed by copying the data from the random memory location to an appropriate memory location. In an operation 607, the NIC is operated to raise a data out-of-order flag in response to recognizing the under-run condition. The method can be extended to include operating the host device to resolve the out-of-order condition by ensuring that each data packet received at the NIC and placed in the host memory by the NIC is correctly located in the host memory.

Figure 7:
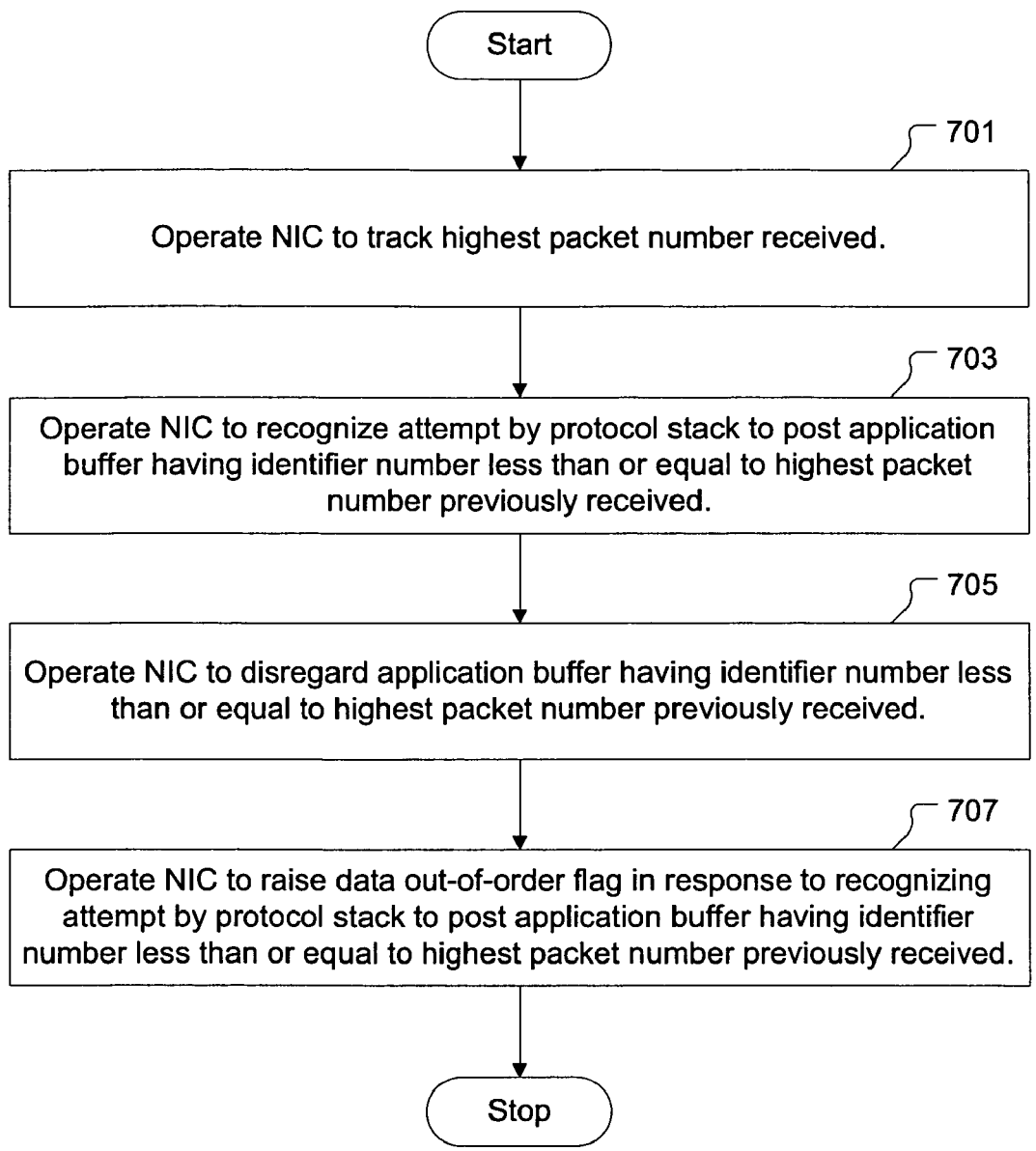
FIG. 7 is an illustration showing a method for receiving network communication, in accordance with one embodiment of the present invention.

FIG. 7 is an illustration showing a method for receiving network communication, in accordance with one embodiment of the present invention. The method includes an operation 701 in which a NIC is operated to track a highest data sequence number received. In an operation 703, the NIC is operated to recognize an attempt by a protocol stack of a host device to which the NIC is attached to post an invalid application buffer, i.e., memory location pointer, to the NIC. The invalid application buffer corresponds to a data sequence number that is less than or equal to the highest data sequence number received by the NIC. In an operation 705, the NIC is operated to disregard the recognized attempt by the host device to post the invalid application buffer. Thus, the NIC is operated to disregard the application buffer whose identifier is less than or equal to the highest data sequence number previously received by the NIC. In an operation 707, the NIC is further operated to set an out-of-order condition flag in response to recognizing the attempt by the protocol stack of the host device to post the invalid application buffer. The method can further include operating the host device to resolve the out-of-order condition by ensuring that each data packet received at the NIC and placed in the host memory by the NIC is correctly located in the host memory.

The method of FIG. 7 can be extended to include operating the NIC to recognize a received data packet as having an invalid sequence number, wherein the invalid sequence number is less than or equal to the highest data sequence number previously received by the NIC. Also, the NIC can be operated to place the received data packet having the invalid sequence number at a random memory location in the host memory. Then, the host device can be operated to copy the data packet having the invalid sequence number from the random memory location in the host memory to a required memory location. Additionally, the NIC can be operated to set an out-of-order condition flag in the host device in response to having recognized the received data packet as having the invalid sequence number. As previously mentioned, the host device can resolve the out-of-order condition by ensuring that each data sequence is correctly located in the host memory.

II. Adapting Networking Input/Output to Asynchronous Socket Interfaces:

Matching Incoming Network Data Package Sequences with Associated Posted Application Buffers:

Keeping in mind the multiple copying of the incoming network data sequences described in FIG. 2 and the zero-copy pre-posting scheme of the present invention, reference is made to FIG. 8 illustrating an exemplary receive side network communication by a Node 3 of the network, in accordance with one embodiment of the present invention. Similar to nodes 1 and 2 of the network, node 3 includes a system memory 103c and a protocol stack 105c including an application layer, a socket layer, a transport layer, a network layer, and a driver layer, starting from the top layer.

Utilizing the services of the application layer, an application 150 has posted buffers A-F to the socket layer, consecutively, starting with the buffer A. In one example, the application layer provides the interface between the application 150 executing on node 3 and the network, while the socket layer operates as the logical entity providing communication between the application 150 and the network. In the illustrated embodiment, the posted application buffers A-F remain at the socket layer until respective incoming network data sequences are passed on to the posted buffers A-F by the transport layer.

The ring buffer 203' has been associated with the random memory locations in the host memory 103c. In the illustrated example, ring buffer registers store pointers to the random buffer locations RB1-RB6 in the memory 103c. According to one example, the IP network layer protocol is implemented, thus providing directionless and best-effort delivery of data sequences between nodes of the network (e.g., nodes 1 through 3, etc.). The network data is shown as a sequence of incoming data S1-S6. This sequence of incoming data is sent on the network medium 109 from a transmitting (Tx) source, and is not always necessarily received in the order it was sent. The sequence of incoming data, in which ever order it is received, is placed in the application ring buffer of the NIC 107c. As each data sequence arrives at the NIC 107c, the DMA engine 201 operates to place each of the incoming data sequences (e.g., S3, S1, S2, . . . ) at the memory location corresponding to the pointer stored in the head register of the ring buffer 203'. For additional information with respect to the head register of the buffer ring 203' and updating of the buffer ring 203', reference can be made to the discussion associated with the FIG. 2.

Thus, the incoming data sequences S1-S6 have arrived at the NIC 107c out of sequence. Incoming data sequences S3, S1, S2, S5, S6, and S4 are successively placed at the memory locations corresponding to the pointers RB1-RB6 stored to ring buffer registers. According to the illustrated embodiment, once the data sequences are placed in the corresponding random memory locations RB1-RB6, the transport layer protocol copies the data sequences S3, S1, S2, S5, S6, and S4 from respective random memory locations RB1-RB5 to corresponding memory locations allocated by the application layer, AB1-AB5. However, as copied, the data sequences S3, S1, S2, S5, S6, and S4 are still in the wrong buffers.

The transport layer of the receiving node 3 is configured to ensure that the incoming data sequences are in the proper sequence and format. As such, the transport layer operates to reassemble the incoming data sequences in accordance with the ordered sequence S1-S6. At this point, the socket layer operates to copy the incoming data sequences to the correct buffers. Specifically, the sequence S1 is copied from the memory location AB2 (i.e., buffer B) to the application buffer A, S2 is copied from the memory location AB3 (i.e., buffer C) to application buffer B, S3 is copied from the memory location AB1 (i.e., buffer A) to the application buffer C, S4 is copied from the memory location AB6 (i.e., buffer F) to the application buffer D, S5 is copied from the memory location AB4 (i.e., buffer D) to the application buffer E, and S6 is copied from the memory location AB5 to the application buffer F.

As discussed in more detail above with respect to FIG. 2, the copying of the incoming data sequences by the TCP from the random memory locations to the allocated memory locations unnecessarily consumes the host system resources. Furthermore, it is desirable to substantially eliminate or minimize the copying of the incoming network data sequences by the socket layer when the incoming data package sequences, as assembled by the TCP, are in the wrong buffers. Yet further, it is desirable to eliminate or minimize the copying of the data into the correct application buffer without making substantial modifications to the transport layer or socket layer.

Matching Incoming Network Data Package Sequences with Application Buffers Pre-Posted to NIC Using Zero-Copy Stack Protocol:

In a situation wherein the transport layer in the receiving node is to ensure ordering of the incoming data sequences, the data sequences propagated up to the transport layer may need to be reshuffled so that the data sequences are placed in the correct corresponding application buffers. In one embodiment, the present invention implements a zero-copy stack architecture to overcome the challenges faced with implementing the zero-copy pre-posting application buffer scheme of the present invention.

Figure 9:
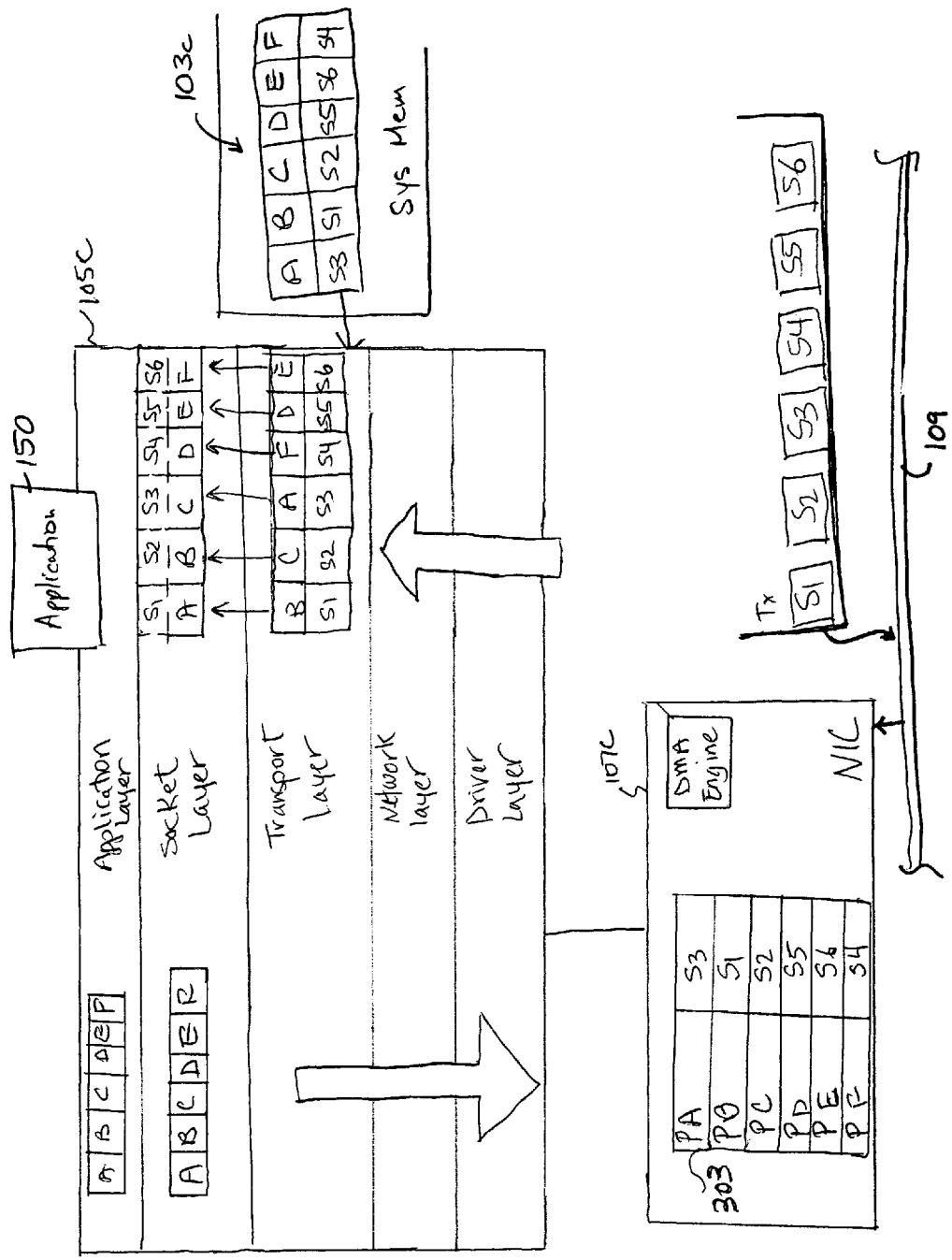
FIG. 9 is a more detailed view of the third node acting as a receiving node on the network, in accordance with one embodiment of the present invention.

FIG. 9 illustrates the landing of incoming network data sequences S1-S6 into incorrect application buffers A-F. In one example, the application buffers A-F have been consecutively posted to the socket layer. The socket layer keeps track of the application buffer A-F, as the application buffers A-F are pre-posted to the NIC 107c.

According to one example, once the application buffers A-F are pre-posted to the ring buffer 303 of the NIC 107c, the DMA engine 201 operates to place the incoming data sequences S1-S6 into the host memory 103c locations corresponding to the pointers stored in the registers of the ring buffer 303. Furthermore, as previously described with respect to FIG. 3, once buffers A-F are pre-posted to the NIC 107c, the ownership of the application buffers A-F is passed to the NIC 107c. Thus, when the application 150 pre-posts the application buffers A-F to the NIC 107c, the application 150 yields the ownership of the buffer to the NIC 107c. However, the application 150 is required to regain ownership of the buffers A-F from the NIC 107c in order to further manage the incoming data sequences placed in the buffers A-F, correspondingly.

As shown, the incoming network data sequences S1-S6 are transmitted to node 3 in the ordered sequence S1-S6 (i.e., the order the incoming data sequences are sent by the sender node). As each incoming data sequence arrives at the NIC 107c, the data sequence is configured to be placed in a respective register in the buffer ring 303 of the NIC 107c. In the illustrated embodiment, however, the incoming data sequences S1-S6 have arrived at the NIC 107c out of sequence and have landed on random registers. Specifically, the data sequence S3, S1, S2, S5, S6, and S4 have respectively landed in the registers having pointers to the memory locations allocated to buffers A, B, C, D, E, and F, respectively. Consequently, the incoming data sequences S3, S1, S2, S5, S6, and S4, will be placed in memory locations allocated to the other buffers. For information about the buffer ring registers and the process of placing the incoming data sequence to the buffer ring and updating the buffer ring 303, reference can be made to the discussion associated with the FIG. 2.

According to one example, once an incoming data sequence is stored to the NIC 107c, the application buffer carrying the incoming data sequence propagates up from the NIC 107c so as to be processed by each of the protocol layers. However, the application buffers are to be reassembled in accordance with the ordered sequence S1-S6 by the TCP, if the incoming data sequences are out of order. However, although the TCP reassembles the incoming data sequences S3, S1, S2, S5, S6, and S4 in accordance with the ordered sequence, the incoming data sequences S3, S1, S2, S5, S6, and S4 are still not placed in the correct application buffer. In order to place the incoming data sequences in respective correct buffers, the socket layer operates to copy the incoming data sequences to the corresponding correct buffer. For example, the sequence S1 is copied from the memory location B to the application buffer A, S2 is copied from the memory location C to application buffer B, S3 is copied from the memory location A to the application buffer C, S4 is copied from the memory location F to the application buffer D, S5 is copied from the memory location D to the application buffer E, and S6 is copied from the memory location E to the application buffer F. In this manner, the application 150, the application layer, and the socket layer defined over the TCP receive the data sequences in the ordered sequence and in the correct buffer.

According to one embodiment, the zero-stack pre-posting scheme of the present invention defines an adaptation layer between the socket layer and the transport layer so as to place the incoming data sequences into the correct buffers, if necessary. The adaptation layer is configured to determine the time an I/O completion event can be generated to the caller, the buffers to be returned, and the amount of data to be returned. The adaptation layer is further configured to insulate the existing transport code from the intricacy of managing pre-posted buffers. Furthermore, the adaptation layer is configured to adapt the traditional network I/O model to the client-transport interfaces based on passing buffers (e.g., the asynchronous socket API semantics, etc.), thus substantially minimizing the impact to the existing transport architecture. According to one exemplary aspect, the pre-posting of the application buffers to the NIC of the zero-stack architecture can substantially eliminate the need for making considerable modifications to the transport layer or the socket layer to place the incoming data sequences in the correct buffers. In this manner, the pre-posting of the application buffers in asynchronous network I/O can minimally impact the existing protocol stack and transport layer.

Figure 10:
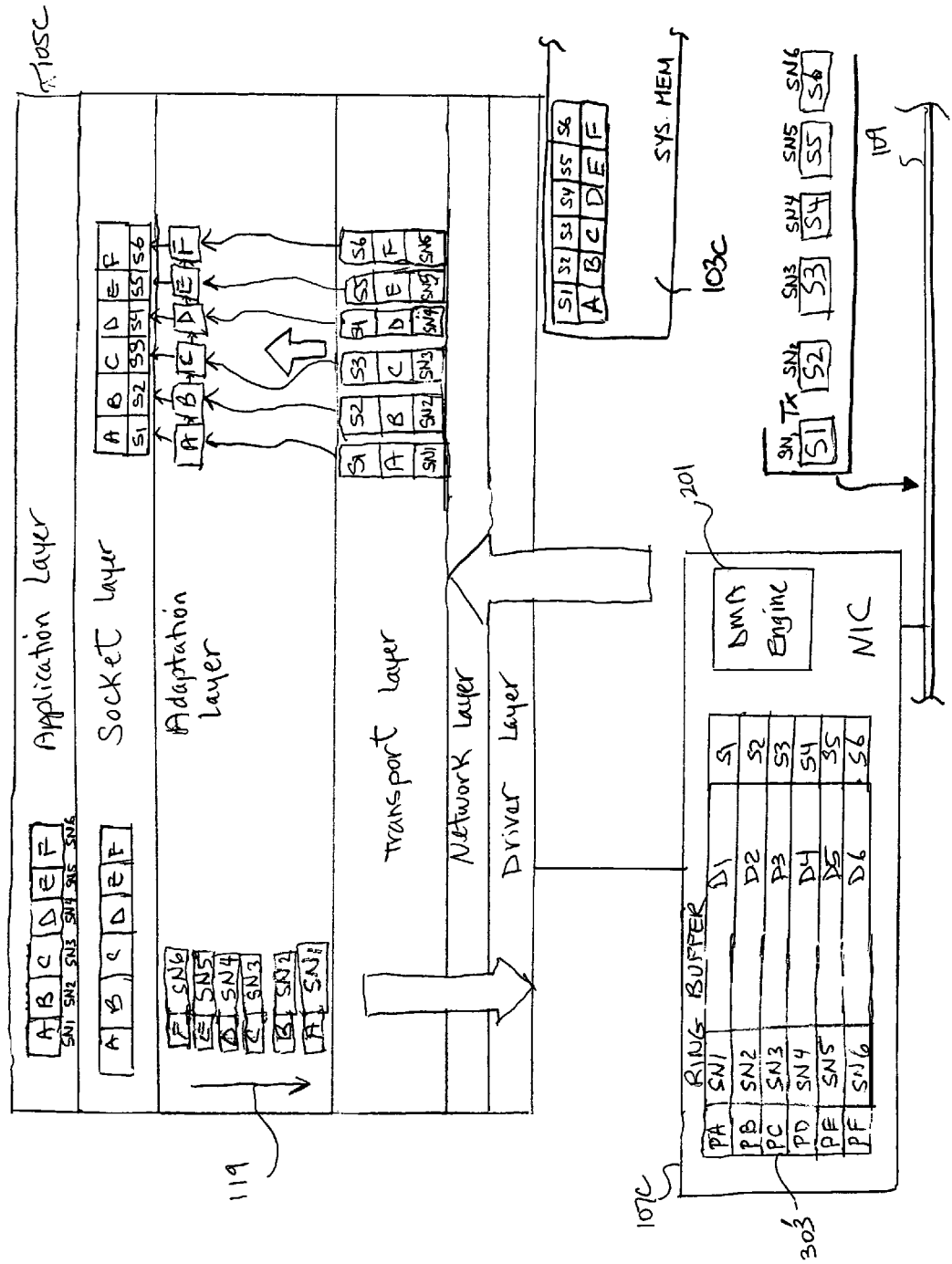
FIG. 10 is a diagram illustrating the landing of incoming network data sequences to correct application buffers, in accordance with one embodiment of the present invention.

FIG. 10 illustrates the landing of the incoming network data sequences S1-S6 into correct application buffers A-F pre-posted to the buffer ring 303', in accordance with one embodiment of the present invention.

In one example, before the incoming data sequences S1-S6 are transmitted, the application 150 is notified of the initial sequence number of the incoming data sequences S1-S6, and are shown by identifiers "SN". In this manner, the application layer can determine that the incoming data sequences S1-S6 respectively have the sequence numbers SN1-SN6. In one example, the application 150 posts the application buffers A-F consecutively to the socket layer. Knowing the expected sequence numbers SN1-SN6, the application posts buffer A in expectation of receiving the incoming data sequence S1 having the SN1 sequence number. In the same manner, buffers B-F are expected to correspondingly include the incoming data sequences S2-S6 having the SN2, SN3, SN4, SN5, and SN6 sequence numbers, respectively.

In accordance with one example, the zero-copy stack architecture of the present invention implements the adaptation layer defined between the socket layer and the transport layer so as to maintain the posting order of the application buffers. According to one embodiment, the adaptation layer is further configured to label the buffers A-F with the expected sequence number of the incoming data sequences. In this manner, the adaptation layer can further track the incoming data sequence each application buffer should include.

In one instance, the application layer provides the adaptation layer with the expected SN. Then, as the buffers A-F are passed down to the adaptation layer, the adaptation layer labels each of the buffers A-F with the corresponding sequence number SN1, SN2, SN3, SN4, SN5, and SN6. In this manner, each application buffer A-F passed down to the adaptation layer is labeled with the respective expected sequence number each of the buffers A-F should include when propagating up the stack from the NIC 107c.

In one simple example, the buffer ring 303' includes a plurality of descriptors D1-D6 (i.e., entries), with D1 being the first entry of the buffer ring 303' to be filled and the descriptor D6 being the last entry to be filled. In this manner, the descriptor D1 is to include the incoming data sequence S1 and the descriptor D6 is to include the incoming data packet S6. Furthermore, buffers A-F are to be posted to descriptors D1-D6, respectively. In one aspect, each descriptor D1-D6 can hold the MTU size of less than or equal 1500 bytes.

In the illustrated embodiment, the incoming data sequences S1-S6 have landed in the NIC 107c in accordance with the ordered sequence of S1-S6. Consequently, the incoming data sequences S1-S6 can be successively placed in the respective memory locations A-F, corresponding to the pointers stored to the ring buffer registers.

Once the data sequences S1-S6 are placed in the corresponding memory locations A-F, the buffers A-F are propagated up the stack from the NIC 107c. At this point, the transport layer protocol is configured to ensure that the incoming data sequences S1-S6 are in the proper sequence (i.e., the ordered sequence). As in the illustrated embodiment the incoming sequences S1-S6 are in accordance with the ordered sequence, the transport layer does not need to perform any shuffling. Furthermore, the buffers A-F include the incoming data sequences S1-S6 respectively having the expected sequence numbers SN1, SN2, SN3, SN4, SN5, and SN6, as labeled by the adaptation layer during the posting of the buffers A-F. Accordingly, in this embodiment, neither the TCP nor the adaptation layer needs to reshuffle data to place the incoming data sequences in the correct buffers.

However, posting and passing down the application buffers down the stack and the arrival of the incoming data sequences and the buffers propagating the stack from the NIC can be asynchronous. According to one scenario, a given incoming data sequence to be placed in a particular application buffer may arrive at the NIC before the corresponding application buffer is posted to the NIC. In another scenario, the incoming data sequences can arrive at the NIC out of sequence, and some may never arrive. As a result, the incoming data sequences may land on the wrong descriptors and thus application buffers. In such a situation, the transport layer is to ensure the ordering of the incoming data sequences. Thus, the data sequences propagated up to the transport layer may need to be reshuffled by the transport layer so as to place the data sequences in accordance with the originally sent data. However, reshuffling of the incoming data sequences in accordance with the ordered sequence does not guarantee that the incoming data sequence placed in the correct buffer. In one example, the buffers propagated up the stack are in the format of a linked list. However, one must note that in another embodiment, any suitable sequencing method can be implemented so long as sequencing the incoming data can be achieved.

Figure 11:
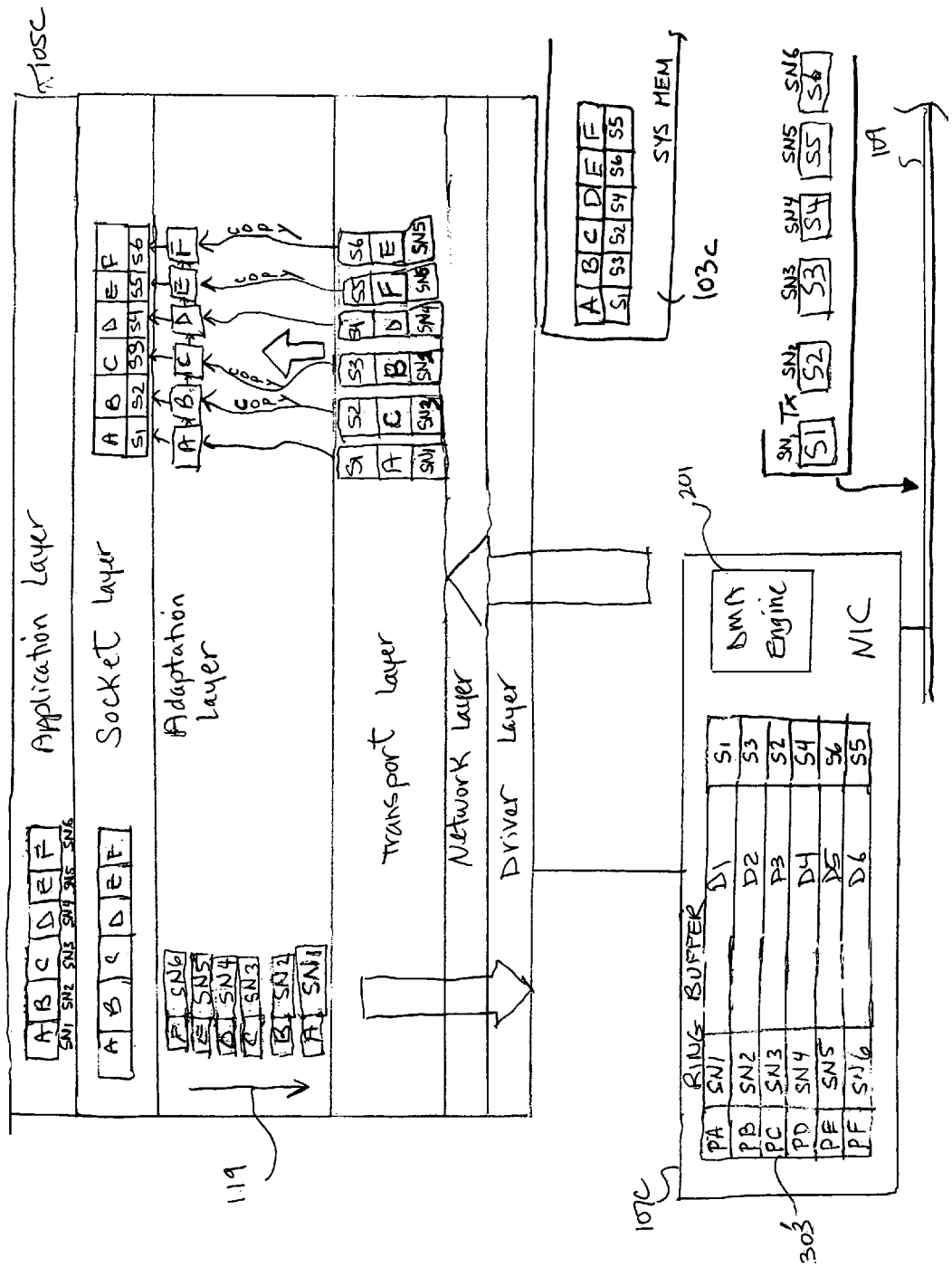
FIG. 11 is a diagram illustrating the landing of incoming network data sequences to incorrect application buffers, in accordance with still another embodiment of the present invention.

FIG. 11 depicts the placing of the incoming network data sequences S1-S6 into random application buffers pre-posted to the buffer ring 303', in accordance with one embodiment of the present invention. As described in more detail with respect to FIG. 10, the application expects that the buffers A-F correspondingly receive the incoming data sequences associated with the sequence numbers SN1-SN6. Accordingly, as the buffers A-F are passed down the stack, the adaptation layer labels each of the buffers A-F with the corresponding expected sequence number SN1, SN2, SN3, SN4, SN5, and SN6.

Thereafter, the application buffers A-F are successively posted to the corresponding descriptor D1-D6 which are configured to hold the incoming data sequences S1-S6, correspondingly. However, in the illustrated embodiment, the incoming data sequences S1-S6 have arrived at the NIC 107c out of sequence (e.g., S1, S3, S2, S4, S6, and S5). Consequently, aside from the buffers A and D, the incoming data sequences S2, S3, S5, and S6 corresponding to the sequence numbers SN2, SN3, SN5, and SN6 have arrived at the wrong buffers. As can be seen, the buffer B has the incoming data sequence for sequence number SN3 instead of sequence number SN2; buffer C has the incoming data sequence for sequence number SN2 instead of sequence SN3; buffer E has the incoming data sequence for sequence number SN6 instead of number sequence SN5; and buffer F has the incoming data sequence for sequence number SN5 instead of sequence number SN6. As a result, the incoming data sequences S3, S2, S6, and S5 are placed in the wrong memory locations (i.e., the memory locations allocated by the application for a different data sequence).

According to the illustrated embodiment, once the data sequences are placed in the NIC, the buffers A-F are propagated up the stack from the NIC 107c. At this point, the transport layer protocol is configured to ensure that the incoming data sequences are in the proper sequence and format (e.g., S1-S6). In the illustrated embodiment, however, the incoming sequences S1-S6 are not in accordance with the sequenced order (i.e., network data). As such, the transport layer is configured to reassemble the incoming data sequences in accordance with the sequenced order prior to providing the adaptation layer with the data.

However, as reassembled by the TCP, not all of the incoming data sequences are defined in the respective expected sequence numbers (or buffers). Rather, the incoming data sequences S2, S3, S5, and S6 are respectively defined in buffers C, B, F, and E, instead of the expected buffers B, C, E, and F. In one embodiment, the adaptation layer is configured to implement the sequence numbers expected by each buffer to reshuffle the incoming data sequences S2, S3, S5, and S6 to define the data sequences into correct buffers. In this manner, the adaptation layer reshuffles data so as to place the data sequence S2 into the buffer B labeled with the expected sequence number SN2, data sequence S3 is placed into the buffer C labeled with the expected sequence number SN3, data sequence S5 is placed into to the buffer E labeled with the expected sequence number SN5, and data sequence S6 is placed into the buffer F labeled with the expected sequence number SN6. At this point, the adaptation layer can provide the socket layer and thus the application layer with correct expected buffers having the correct data sequences.

Figure 12:
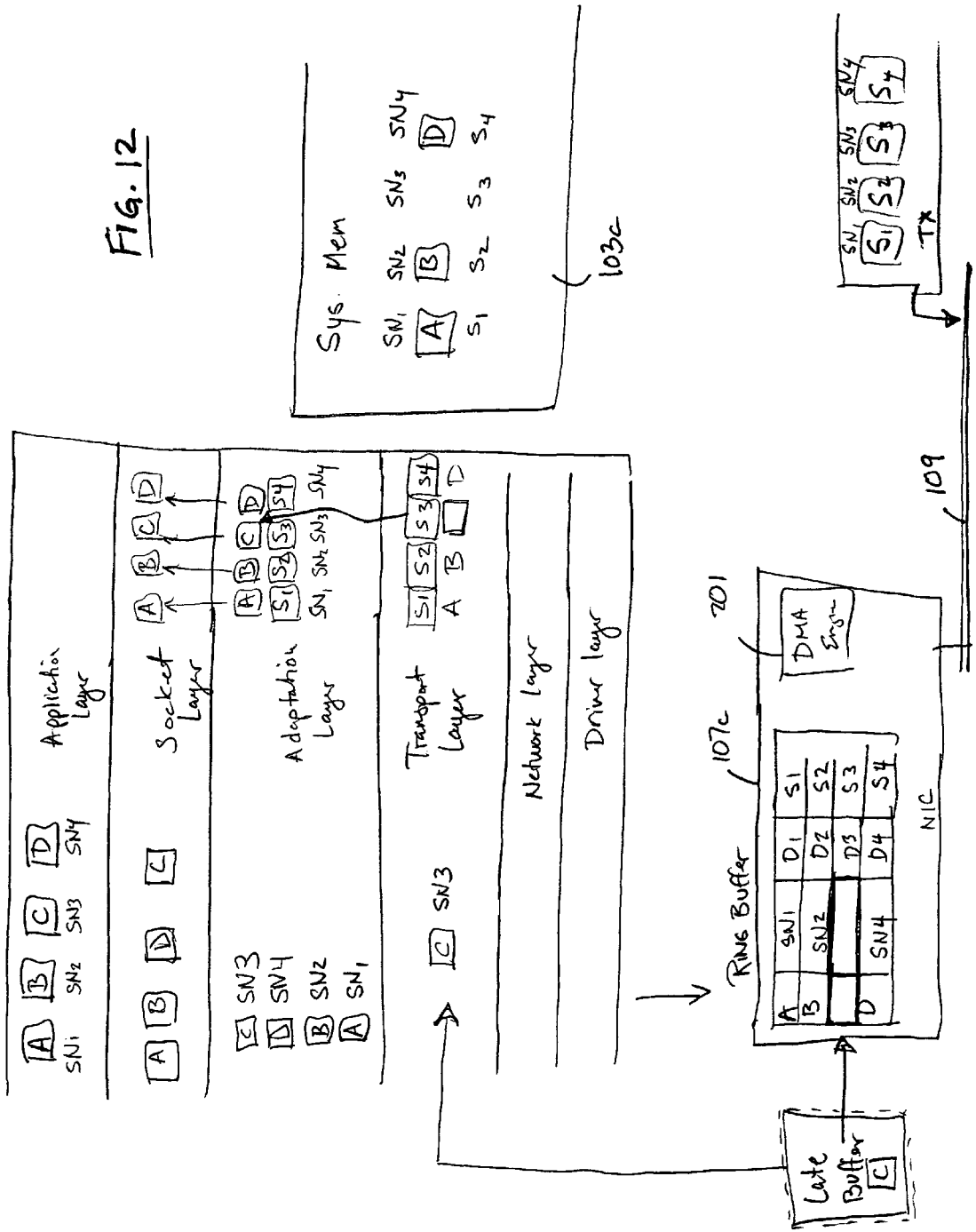
FIG. 12 is a diagram illustrating the capability of the present invention to avoid canceling posted buffers, in accordance with still another embodiment of the present invention.

FIG. 12 shows the capability of the present invention to prevent the posting of application buffers for previously received incoming data sequences is illustrated, in accordance with one embodiment of the present invention. The application buffers A, B, and D have been posted by the application layer. As shown, the application layer expects that buffers A, B, and D respectively receive the incoming data sequences corresponding to the sequence numbers SN1, SN2, and SN4. Accordingly, before being posted to the NIC 107c, the adaptation layer labels the buffers A, B, and D with respective expected sequence numbers SN1, SN2, and SN4. Application buffer C is posted after the application buffer D, and as shown, is expected to receive the incoming data sequence S3 in the SN3.

The application buffers A, B, and D are successively posted to the corresponding descriptors D1, D2, and D4 in the NIC 107c. As shown, incoming data sequences S1-S4 have successively arrived at the NIC 107c and respectively landed in the descriptors D1-D4. Although the buffer C has not been posted by the application, the incoming data sequence S3 has arrived at the NIC 107c and placed in the descriptor D3.

At this point, the buffers A, B, and D as well as the unmarked buffer including the incoming sequence number SN3 are propagated up the stack from the NIC 107c. The incoming data sequences are placed in order by the TCP, in accordance with the ordered sequence S1-S4. As reassembled by the TCP, the incoming data sequences S1, S2, and S4 are shown to be defined in accordance with the ordered sequence and correct buffer. Thus, data in buffers A, B, and D can be sent up to the adaptation layer and be placed in the proper buffer without the adaptation layer having to reshuffle the data. As such, the data in the data buffers in the TCP layer linked list can be matched one-to-one with the data in the data buffers in the adaptation layer linked list. Thus, in accordance with one embodiment, one-to-one matching of the buffers establishes that the incoming data sequence S3 in the unmarked buffer is the data for the sequence number SN3 expected by the buffer C. In one example, the adaptation layer reshuffles the data from the unmarked buffer to the buffer C defined in the socket layer.

As illustrated, the application has posted buffer C after the incoming sequence S3 has been received by the NIC and propagated up the stack to the TCP layer. According to one example, if data has arrived at the NIC before the corresponding buffers are posted to the NIC, the data may need to be reshuffled or a cancellation request may need to be sent to the NIC so as to reclaim the ownership of the buffers that have been misplaced in the buffer ring. In order to avoid the costs associated with canceling late posted buffers, Buffer C should be prevented from being posted to the NIC. Thus, in one example, each layer of the zero-copy stack is configured to monitor the highest sequence number (SN) the layer has received from the network thus far. Thereafter, each layer is configured to ignore application buffers posted for the sequence numbers that previously arrived at the layer. In the illustrated embodiment, the adaptation layer has labeled the buffer C with the sequence number SN3. However, when the buffer C is passed down to the transport layer, the transport layer does not allow the buffer C to be posted (e.g., ignores the buffer), as the sequence number SN3 has already been received by the transport layer. The buffer C has been intercepted by the transport layer as neither the application layer, socket layer, or adaptation layer has yet received the sequence number SN3 from the network. Comparatively, the driver layer, the network layer, and the transport layer have received the sequence number SN3. However, because the buffer C is being passed down the stack, the transport layer is the first layer that has seen the sequence number SN3. In this manner, the correct data can be copied to the right buffers and can be sent back up the stack instead of passing late buffer down to the NIC and having to cancel the late posted buffer. This is an important optimization that can minimize the possibly very expensive buffer cancellation operations, and can get data and buffers back in sync much sooner.

It should be appreciated that the method described with respect to FIGS. 4 through 7 can be implemented separately or in combination with each other. In addition, with respect to the method operations of FIGS. 4 through 7, it should be appreciated that the order in which the method operations are performed may vary from that specifically described herein. Additionally, the method operations can be performed in parallel.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

Embodiments of the present invention can be processed on a single computer, or using multiple computers or computer components which are interconnected. A computer, as used herein, shall include a standalone computer system having its own processor, its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network of coupled computer systems so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for receiving network communication at a host, the host having a network interface card (NIC) for receiving the network communication from a network, comprising:
   requesting data through an application that is in communication with an application layer of a protocol stack;
   posting a set of buffers to system memory;
   passing information regarding the set of buffers to an adaptation layer, the adaptation layer being interposed between a socket layer and a transport layer of the protocol stack, the set of buffers identified in the adaptation layer being assigned expected sequence numbers for a sequence of incoming data;
   passing a set of pointers to a ring buffer in the NIC, the set of pointers referencing the set of buffers in the system memory;
   with each layer in the protocol stack, monitoring a highest one of the sequence of incoming data received from the network;
   at each layer, determining if a buffer to be pre-posted is for data already received at the layer, the determining being accomplished by examining a sequence number of the buffer to be pre-posted with the highest monitored one of the sequence of incoming data; and
   reassembling, at the transport layer, the sequence of incoming data in an ordered sequence if the incoming data is not in an ordered sequence;
   wherein the adaptation layer reshuffles data of the sequence of incoming data to the set of buffers according to the expected sequence numbers, the expected sequence numbers being consecutively ordered to ensure that the sequence of incoming data in the ordered sequence is placed to the set of buffers according to the expected sequence numbers.

2. A method for receiving network communication at a host, the host having a network interface card (NIC) for receiving the network communication from a network, as recited in claim 1, wherein the adaptation layer eliminates changes in the socket layer and the transport layer of the protocol stack.

3. A method for receiving network communication at a host, the host having a network interface card (NIC) for receiving the network communication from a network, as recited in claim 1, wherein the posting of the set of buffers to system memory includes pre-posting of the buffers from the application layer down through the protocol stack and to the ring buffer of the NIC.

4. A method for receiving network communication at a host, the host having a network interface card (NIC) for receiving the network communication from a network, as recited in claim 1, further comprising:
   at each layer in which a buffer to be pre-posted is for data already received at the layer, ignoring the buffer to be pre-posted so as to cancel the pre-posting.

5. A method for receiving network communication at a host, the host having a network interface card (NIC) for receiving the network communication from a network, as recited in claim 4, wherein the ignoring of the buffer to be pre-posted avoids cancellation of the buffer to be pre-posted at a layer of the protocol stack below the layer at which the buffer to be pre-posted is ignored.

6. A method for receiving network communication at a host, the host having a network interface card (NIC) for receiving the network communication from a network, as recited in claim 1, wherein the expected sequence numbers of the set of buffers are communicated by the adaptation layer to the NIC.

7. A method for receiving network communication at a host, the host having a network interface card (NIC) for receiving the network communication from a network, as recited in claim 6, wherein the NIC is able to track sequence numbers of received data using the expected sequence numbers of the set of buffers.

8. A method for managing receipt of network data at a host through a network interface card (NIC) connected to a network, comprising:
   receiving data for an application, the data being communicated to an application layer of a protocol stack that is in communication through the NIC;
   posting a set of buffers to the system memory, the posting including pre-posting the set of buffers to the NIC;
   passing information regarding the set of buffers to an adaptation layer, the adaptation layer being interposed between a socket layer and a transport layer of the protocol stack, the set of buffers identified in the adaptation layer being assigned expected sequence numbers for a sequence of incoming data;
   passing a set of pointers to a ring buffer in the NIC, the set of pointers referencing the set of buffers in the system memory;

at each layer in the protocol stack, monitoring a highest one of the sequence of incoming data received from the network;

determining at each layer if a buffer to be pre-posted is for data already received at the layer, the determining being accomplished by examining a sequence number of the buffer to be pre-posted with the highest monitored one of the sequence of incoming data;

reassembling, at the transport layer, the sequence of incoming data in an ordered sequence if the incoming data is not in an ordered sequence, the reassembling being performed before the sequence of incoming data is presented to the adaptation layer, the adaptation layer being configured to reshuffle data of the sequence of incoming data to the set of buffers according to the expected sequence numbers, the expected sequence numbers being consecutively ordered to ensure that the sequence of incoming data in the ordered sequence is placed to the set of buffers according to the expected sequence numbers; and communicating the set of buffers with the reshuffled data to the socket layer in accordance with the expected sequence numbers.

9. A method for managing receipt of network data at a host through a network interface card (NIC) connected to a network as recited in claim 8, further comprising:
communicating the set of buffers with the reshuffled data from the socket layer to the application layer.

10. A method for managing receipt of network data at a host through a network interface card (NIC) connected to a network as recited in claim 9, wherein the application layer is configured to access the reshuffled data from the system memory from the set of buffers.

11. A method for managing receipt of network data at a host through a network interface card (NIC) connected to a network as recited in claim 8, further comprising:
at each layer in which a buffer to be pre-posted is for data already received at the layer, ignoring the buffer to be pre-posted so as to cancel the pre-posting.

12. A method for managing receipt of network data at a host through a network interface card (NIC) connected to a network as recited in claim 11, wherein the ignoring of the buffer to be pre-posted avoids cancellation of the buffer to be pre-posted at a layer of the protocol stack below the layer at which the buffer to be pre-posted is ignored.

\* \* \* \* \*